United States Patent
Mathauer et al.

(10) Patent No.: US 7,868,093 B2
(45) Date of Patent: *Jan. 11, 2011

(54) METHOD FOR PRODUCING BLENDS CONSISTING OF POLYSTYRENE AND OF A CROSS-LINKED POLYVINYL PYRROLIDONE HAVING A REDUCED STYRENE RESIDUAL MONOMER CONTENT

(75) Inventors: Klemens Mathauer, Heidelberg (DE); Marianna Pierobon, Ludwigshafen (DE); Tobias Petsch, Mörschied (DE); Karl-Otto Heilmann, Eisenberg (DE); Michael Kerber, Weinheim (DE); Robert Bayer, Sinsheim (DE)

(73) Assignee: BASF SE, Ludwigshafen (DE)

( * ) Notice: Subject to any disclaimer, the term of this patent is extended or adjusted under 35 U.S.C. 154(b) by 584 days.

This patent is subject to a terminal disclaimer.

(21) Appl. No.: 11/908,643

(22) PCT Filed: Mar. 14, 2006

(86) PCT No.: PCT/EP2006/060703

§ 371 (c)(1), (2), (4) Date: Sep. 14, 2007

(87) PCT Pub. No.: WO2006/097470

PCT Pub. Date: Sep. 21, 2006

(65) Prior Publication Data

US 2008/0146739 A1    Jun. 19, 2008

(30) Foreign Application Priority Data

Mar. 16, 2005 (DE) .................... 10 2005 012 484

(51) Int. Cl.
C08L 25/02 (2006.01)
C08L 33/00 (2006.01)
C08L 35/00 (2006.01)
C08L 39/00 (2006.01)

(52) U.S. Cl. ................ 525/217; 525/241; 524/516; 524/577

(58) Field of Classification Search ................ 525/217, 525/241; 524/516, 577

See application file for complete search history.

(56) References Cited

U.S. PATENT DOCUMENTS

| 2,713,043 | A | 7/1955 | Daumiller |
| 5,786,445 | A | 7/1998 | Wulff et al. |
| 6,525,156 | B1 | 2/2003 | Ernst et al. |
| 2003/0124233 | A1 | 7/2003 | Gomez et al. |
| 2003/0195316 | A1 | 10/2003 | Stark |
| 2004/0094486 | A1 | 5/2004 | Drohmann et al. |
| 2008/0146739 | A1 | 6/2008 | Mathauer et al. |
| 2009/0275691 | A1 * | 11/2009 | Meffert et al. ............ 524/516 |

FOREIGN PATENT DOCUMENTS

| DE | 808788 | 7/1951 |
| DE | 19537114 A1 | 4/1997 |
| EP | 0377115 A2 | 7/1990 |
| EP | 1318159 A2 | 6/2003 |
| EP | 1354900 | 10/2003 |
| JP | 2002-097362 A2 | 4/2002 |
| WO | WO-00/68286 A1 | 4/2000 |
| WO | WO-02/32544 A1 | 4/2002 |
| WO | WO-2006/097470 | 9/2006 |

* cited by examiner

*Primary Examiner*—Nathan M Nutter
(74) *Attorney, Agent, or Firm*—Connolly Bove Lodge & Hutz LLP

(57) ABSTRACT

Process for removal of residual styrene monomers from polystyrene and from blends comprising water-insoluble, crosslinked polyvinylpyrrolidone, via treatment with water, which comprises carrying out the treatment on a particulate solid blend.

17 Claims, No Drawings

METHOD FOR PRODUCING BLENDS CONSISTING OF POLYSTYRENE AND OF A CROSS-LINKED POLYVINYL PYRROLIDONE HAVING A REDUCED STYRENE RESIDUAL MONOMER CONTENT

RELATED APPLICATIONS

This application is a national stage application (under 35 U.S.C. §371) of PCT/EP2006/060703, filed Mar. 14, 2006, which claims benefit of German application 10 2005 012 484.4, filed Mar. 16, 2005.

DESCRIPTION

The present invention relates to a process for preparation of blends obtained from polystyrene and from a crosslinked polyvinylpyrrolidone polymer with reduced residual styrene monomer content.

Polystyrene is often used in the context of foods and of other consumable items. By way of example, polystyrene is used as filter aid in clarifying drinks. Blends composed of polystyrene and of crosslinked polyvinylpyrrolidone are also used for this purpose.

However, commercially available polystyrene grades usually retain a residual monomer content in the region of some hundreds of ppm.

Amounts of from 200 to 400 ppm of styrene in air can be detected by odor. Even amounts as small as 0.2 ppm can be detected by the senses in food or drink, for example tea or fruit drinks.

Sensory impairment can therefore arise when polystyrene is used in the context of foods and of other consumable items if styrene migrates out of the polystyrene.

WO 02/32544 describes by way of example blends composed of polystyrene and of crosslinked polyvinylpyrrolidone which are obtained via compounding in an extruder. These products, too, have unsatisfactory residual styrene monomer content, especially because they have a large specific surface area in the range of from 2 to 8 m$^2$/g, determined via BAT measurements to DIN 66131.

In the case of polystyrene obtained via solution polymerization, styrene is usually removed via devolatilization of the polymer solution. The styrene content can also be lowered via devolatilization of a polystyrene melt in an extruder.

DE 808788 describes the removal of volatile components from polystyrene and from styrene copolymers via treatment with steam. The aim of this process is to raise the softening point of the polymers.

JP-A 2002097362 describes the deodorization of polyphenylene ether/polystyrene mixtures in the presence of water, the treatment here taking place in an extruder in the melt at temperatures >280° C.

EP-A 377115 moreover describes the preparation of blends composed of polyphenylene ethers and of polystyrenes, the removal of volatile substances, such as toluene and styrene, taking place here via steam treatment of the pelletized blends in an extruder.

DE 19537114 describes a process for the drying of thermoplastic polymer powders in the melt in a mixing apparatus.

It has been found that known processes such as the water treatment of a melt in an extruder or devolatilization of the melt cannot lower the residual monomer content to the desired extent.

It was an object of the present invention to find an improved process for the treatment of blends composed of polystyrene and of crosslinked polyvinylpyrrolidone polymers which leads to very low residual styrene monomer content.

Accordingly, a process has been found for reducing the residual styrene monomer content in blends composed of polystyrene and of water-insoluble crosslinked polyvinylpyrrolidone polymers, via treatment with water, which comprises treating the particulate solid blend.

The inventive process preferably gives blends with a residual monomer content of <20 mg/kg of styrene, particularly preferably <10 mg/kg, based on the total weight of the blend.

Polymer blends are mixtures of chemically different polymers. In the case of the present invention, the blends are composed of a thermoplastic polystyrene component and of a non-thermoplastic water-insoluble crosslinked polyvinylpyrrolidone, and the blends here cannot be broken down by physical methods to give the individual components.

Any of the familiar polystyrene grades may be used as polystyrene component, examples being standard polystyrene, impact-modified polystyrene (SB grades), such as copolymers composed of styrene and butadiene, or high-impact-modified polystyrene (HIPS grades), for example polystyrene modified with polybutadiene rubber or modified with styrene-butadiene rubber. These polystyrenes are available commercially, for example in the form of PS 158 k, PS 486 M or Styrolux® (BASF).

According to the invention, the blends comprise, as second polymer component alongside the polystyrene component, water-insoluble crosslinked polyvinylpyrrolidone polymers which do not form gels on absorption of water and which in the literature are also termed "popcorn polymers" (cf. J. W. Breitenbach, Chimia, Vol. 21, pp. 449-488, 1976). In the pharmacopoeias such as USP or Ph. Eur. these polymers are termed crospovidones. Polymers of this type have a porous structure and have many cavities.

The polymers do not form gels even on absorption of water. The swelling volume of polymers of this type in water at 20° C. is usually in the range from 2 to 10 l/kg, preferably from 4 to 8 l/kg.

The preparation of popcorn polymers is known per se. The conduct of a polymerization process substantially determines whether it gives popcorn polymers rather than glassy polymers. EP-B 88964 describes by way of example processes suitable for the preparation of popcorn polymers as used for the purposes of the present invention.

The popcorn polymers are crosslinked polymers. The crosslinking can take place either physically or chemically. Suitable chemical crosslinking agents are generally compounds whose molecule comprises at least two ethylenically unsaturated non-conjugated double bonds, and which therefore act as difunctional crosslinking agents during the polymerization process. Examples of preferred representatives are alkylenebisacrylamides, such as methylenebisacrylamide and N,N'-acryloylethylenediamine, N,N'-divinylethyleneurea, N,N'-divinylpropyleneurea, ethylidenebis-3-(N-vinylpyrrolidone), N,N'-divinylimidazolyl(2,2')butane, and 1,1'-bis(3,3')vinylbenzimidazolin-2-one)-1,4-butane.

Examples of other suitable crosslinking agents are alkylene glycol di(meth)acrylates, such as ethylene glycol diacrylate, ethylene glycol dimethacrylate, tetraethylene glycol diacrylate, tetraethylene glycol dimethacrylate, diethylene glycol diacrylate, diethylene glycol dimethacrylate, aromatic divinyl compounds, such as divinylbenzene and divinyltoluene, and also vinyl acrylate, allyl acrylate, allyl methacrylate, divinyldioxane, pentaerythritol triallyl ether, triallylamines and also mixtures of the crosslinking agents.

Particularly preferred crosslinking agents are ethylene glycol diacrylate, ethylene glycol dimethacrylate, N,N'-divinylethyleneurea (DVEH), and divinylbenzene (DVB).

The amounts used of the crosslinking agents are from 0 to 10% by weight, preferably from 0.1 to 8% by weight, particularly preferably from 0.2 to 5% by weight, based on the total weight of the polymer.

These crospovidones are available commercially, for example in the form of Divergan® grades, BASF, or Polyplasdone® grades, ISP.

The grain sizes of the popcorn polymers are generally from 15 μm to 1500 μm.

The polymer blends are preferably obtained via compounding in an extruder, i.e. via coextrusion of the polystyrene with the crosslinked polymer. During the compounding process, the non-thermoplastic popcorn polymer is dispersed within the melt of the thermoplastic polystyrene. The processing takes place at temperatures which are above the glass transition temperature of the polystyrene component but below the decomposition temperature of the popcorn polymers. The blends are usually obtained at barrel temperatures of from 180 to 220° C. The processing preferably takes place in a twin-screw extruder. The coextrusion process can also take place in the presence of up to 10% by weight of water, based on the total amount of the polymers. The resultant granular blends can be ground in an additional step to give powders, and average grain sizes of from 20 to 100 μm can be set here.

The residual monomer contents of the blends prior to treatment by the inventive process are usually from 100 to 500 ppm of styrene.

The manner of treatment according to the inventive process is such that the particulate condition of the blends is retained during the treatment. The blends are not melted, but remain in a particulate solid condition.

To carry out the inventive process, the blends are first treated with water and stirred to give an aqueous slurry.

The residual styrene monomer can be removed via steam distillation of the aqueous slurry.

To carry out the steam distillation process, the blends are mixed in a suitable pressure-tight container with water in a blend:water ratio of from 1:1 to 1:10 (polymer:water [kg:l]). Steam is passed, with stirring, into the resultant aqueous slurry and water is simultaneously removed by distillation. The internal temperature during treatment is usually from 100 to 120° C. The treatment time depends on the amount of blend to be treated.

After the steam distillation process the blends can be isolated from the water via filtration and can then be dried, if appropriate in vacuo, at temperatures up to 100° C. If the steam distillation process is used for fine-particle, pulverulent blends, the aqueous slurry of the blends can be dried directly by means of spray drying without any filtration step, after the steam distillation process.

According to one preferred embodiment, the polymer blend/water mixture is prepared in a heatable container equipped with an apparatus for moving the composition to be treated, e.g. in a dryer, preferably in a paddle dryer, with subsequent direct evaporation of the water. The water is removed at temperatures of from 80 to 105° C. During the treatment, a stream of an inert gas, such as nitrogen or argon, is preferably passed over the composition. In this version of the process, the ratio [kg:l] of blend to water is selected to be from 1:1 to 3:1, preferably from 1:1 to 2:1. Because of the high polymer content, the water mixture to be treated is a moist granular composition rather than a slurry at the start of the treatment. In this case, no additional filtration and drying steps are needed, and this version of the process is therefore particularly inexpensive.

Both in the case of the steam distillation process and in the case of the treatment in a paddle dryer, the blends are present as discrete particles in the aqueous slurry during the treatment. Even if the treatment temperature is on occasions, as a function of the type of the polystyrene component, in the region of the glass transition temperature of the polystyrene component of the blend, no melt is formed, and the particle size distribution of the blend is therefore retained.

The residual monomer content of the blends obtained after the inventive process is <20 ppm (<20 mg/kg), preferably <10 ppm.

Surprisingly, the blends composed of polystyrene and crospovidone could be treated in the inventive manner without any impairment of the morphology and of the stability of the blends. In view of the ability of the crosslinked polymer component to absorb water and sometimes to develop a considerable swelling pressure, the person skilled in the art would actually have expected separation of the blend and destruction of the cavity structure.

It was also surprising that the residual monomer content could be lowered to such low values in a simple and inexpensive manner during the preferred version of the process, the treatment in a paddle dryer, using only very small amounts of water.

Because of the very low residual monomer content of <10 ppm, the blends obtained by the inventive process have excellent suitability for use in the context of foods and of other consumable items, for example as filter aids during the treatment of drinks, such as fruit juices, beer, wine and sparkling wines, and of tea products, or other processes for the adsorption of undesired ingredients from foods and other consumable items.

EXAMPLES

Steam Distillation: General Specification

Polymer blend and deionized water in a ratio of from 1:3 to 1:10 were mixed in a glass vessel or metal vessel. The vessel was heated to an external temperature of 120° C. Steam was passed from a steam generator into the vessel and at the same time water was removed by condensation (steam distillation) by way of a distillation bridge. During the steam distillation process, the internal temperature was from 100° C. to 120° C., with steam pressures of from 0.2 to 0.5 MPa.

At the end of the steam distillation process, the powder or the coarse-grain products were isolated via filtration and residual styrene was determined as described below.

Paddle Drying: General Specification

Polymer blend and water were mixed in the appropriate ratio and treated in a paddle dryer. The mixture was heated (up to 100° C.) and dried at atmospheric pressure by a stream of nitrogen.

Determination of Residual Moisture and of Residual Styrene: General Specification The final specimen and any other intermediate specimens were divided into two sub-specimens. The first sub-specimen was used to determine solids content SC (by means of drying in vacuo at 80° C.). At the same time, residual styrene was determined in the second specimen (without further drying).

The following method was used for residual styrene determination:

The analysis specimen was dissolved in N,N-dimethylacetamide (DMAA) and studied by headspace gas chromatography. Gas-chromatographic separation took place on a fused silica capillary with a film composed of polydimethylsiloxane. A flame ionization detector was used. Quantification was by the standard addition method.

This method was used to determine residual styrene content W, based on the moist specimen. To obtain the residual styrene value based on solid, calculation also took solids content into account:

Residual styrenes [mg/kg]=$W/SC$  a)

Residual styrene based on polystyrene content can be calculated for the polymer blends. The polystyrene content in the polymer blend in the examples below is 70%:

Residual styrene based on polystyrene [mg/kg]=residual styrene (a)/polystyrene content  b)

The blends used in the examples below were obtained via coextrusion with and without injection of water. In the case of injection of water, the percentages stated for the amount of water used are % by weight, based on the total amount of polymer. The percentages stated for the polymer components used are % by weight, based on the total amount of polymers in the blend.

A Malvern Mastersizer was used to determine average particle size distribution D[0.5].

1) Treatment of Coarse-Grain Blends Via Steam Distillation

Example 1 A

The starting material (average particle size 2 mm) was obtained via coextrusion of HIPS polystyrene (70%) and crospovidone (30%) without injection of water.

Treatment: Steam Distillation at 100° C., 500 g of Blend, 1500 g of Water

| Treatment time [min] | Residual styrene [mg/kg] | Residual styrene, based on polystyrene [mg/kg] | Residual styrene, based on residual styrene in starting material [%] |
|---|---|---|---|
| 0 | 175 (starting material) | 250 | 100 |
| 120 | 60 | 85.7 | 34.3 |
| 180 | 50 | 71.4 | 28.6 |
| 240 | 45 | 64.3 | 25.7 |
| 300 | 40 | 57.1 | 22.9 |
| 360 | 30 | 42.9 | 17.1 |

Example 1 B

The starting material (average particle size 2 mm) was obtained via coextrusion of standard polystyrene (70%) and crospovidone (30%), with injection of 1.5% of water.

Treatment: Steam Distillation at 100° C., 500 g of Blend, 1500 g of Water

| Treatment time [min] | Residual styrene [mg/kg] | Residual styrene, based on polystyrene [mg/kg] | Residual styrene, based on residual styrene in starting material [%] |
|---|---|---|---|
| 0 | 91 (starting material) | 130 | 100 |
| 120 | 34 | 48.6 | 37.4 |
| 240 | 23.7 | 33.9 | 26.0 |
| 360 | 19.1 | 27.3 | 21.0 |
| 480 | 13.8 | 19.7 | 15.2 |
| 600 | 9.3 | 13.3 | 10.2 |

Example 1 C

The starting material (average particle size 2 mm) was obtained via coextrusion of standard polystyrene (70%) and crospovidone (30%), with injection of water (1.5%).

Treatment: Steam Distillation at 120° C. 20 kg of Blend, 80 kg of Water

| Treatment time [min] | Residual styrene [mg/kg] | Styrene based on polystyrene [mg/kg] | Residual styrene, based on residual styrene in starting material [%] |
|---|---|---|---|
| 0 | 114.5 (starting material) | 164 | 100 |
| 300 | 4.2 | 6 | 3.7 |

2) Treatment of Pulverulent Blends

Examples 2 A, B, C, D

The starting material was obtained via coextrusion of standard polystyrene (70%) and crospovidone (30%) with injection of water, and then ground to the stated particle sizes.

Treatment: Steam Distillation at 100° C.

| | Example | | | |
|---|---|---|---|---|
| | 2 A | 2 B | 2 C | 2 D |
| Amount of water injected within starting material | 1.25% | 1.5% | 0.5% | 0.5% |
| D[0.5] of specimen | 56 | 82 | 59 | 72 |
| Residual styrene in starting material (residual styrene in starting material, based on polystyrene) [mg/kg] | 103 (147) | 134 (191) | 118 (167) | 140 (200) |
| Treatment time [min] | 360 | 360 | 360 | 240 |
| Final residual styrene value (final residual styrene value, based on polystyrene) [mg/kg] | 3.6 (5.1) | 3.5 (5) | 2 (2.8) | 2 (2.8) |
| Final residual styrene value, based on residual styrene in starting material [%] | 3.5 | 2.6 | 1.7 | 1.4 |

Examples 2 E, F

The starting material was obtained from standard polystyrene (70%) and crospovidone (30%) with injection of water (0.5%), and ground (average particle size D[0.5]=59 μm)

Treatment: Paddle Drying at 100° C.

Examples 3 A, B

The starting material was obtained via coextrusion of standard polystyrene (70%) and crospovidone (30%) with injection of water (0.5%), and then ground to the stated particle size.

Treatment: Steam Distillation (at 100° C.) of Pulverulent Blends with Various Average Particle Sizes

| | Example | |
|---|---|---|
| | 2 E | 2 F |
| | Blend (ratio by weight) | |
| | Powder:water (1:1) | Powder:water (1.5:1) |
| Treatment time [min] | Residual styrene [mg/kg] | Residual styrene, based on residual styrene in starting material [%] | Residual styrene [mg/kg] | Residual styrene, based on residual styrene in starting material [%] |
|---|---|---|---|---|
| 0 | 111 (starting material) | 100 | 133 (starting material) | 100 |
| 60 | | | 12 | 9.0 |
| 120 | 3 | 2.7 | 3 | 2.2 |
| 180 | | | 2 | 1.5 |
| 240 | <2 | 1.8 | <2 | 1.5 |

Examples 3 C, D

The starting material was obtained via coextrusion of standard polystyrene (70%) and crospovidone (30%) with injection of water (0.5%), and then ground (average particle size D[0.5]=26 μm)

Treatment: Paddle Drying of Aqueous Slurries of Pulverulent Blends at 100° C.

| | Example | |
|---|---|---|
| | 3 A | 3 B |
| D[0.5] of starting material | 26 | 33 |
| Residual styrene in starting material (residual styrene in starting material, based on polystyrene) [mg/kg] | 128 (183) | 127 (181) |
| Treatment time [min] | 120 | 120 |
| Final residual styrene value (final residual styrene value, based on polystyrene) [mg/kg] | 2.6 (3.7) | 2 (2.8) |
| Final residual styrene value, based on residual styrene in starting material [%] | 2.0 | 2.0 |

| | Example | |
|---|---|---|
| | 3 C) | 3 D) |
| | Blend (ratio by weight) | |
| | Powder:water (1:1) | Powder:water 1.87:1 |
| Treatment time [min] | Residual styrene [mg/kg] | Residual styrene, based on residual styrene in starting material [%] | Residual styrene [mg/kg] | Residual styrene, based on residual styrene in starting material [%] |
|---|---|---|---|---|
| 0 | 137 | 100 | 124.4 | 100 |

| | Example | |
|---|---|---|
| | 3 C) | 3 D) |
| | Blend (ratio by weight) | |
| | Powder:water (1:1) | Powder:water 1.87:1 |
| Treatment time [min] | Residual styrene [mg/kg] | Residual styrene, based on residual styrene in starting material [%] | Residual styrene [mg/kg] | Residual styrene, based on residual styrene in starting material [%] |
|---|---|---|---|---|
| 60 | | | 14.1 | 11.3 |
| 120 | 8 | 5.8 | 4.0 | 3.3 |
| 180 | | | 3.0 | 2.4 |
| 240 | 2 | 1.4 | 2.0 | 1.6 |

Example 4

For comparison, ground standard polystyrene with average particle size D[0.5] of 203 μm was treated.

Treatment: Steam Distillation at 100° C. of 200 g of Polystyrene, 1800 g of Water

| Treatment time [min] | Residual styrene [mg/kg] | Residual styrene, based on residual styrene in starting material [%] |
|---|---|---|
| 0 | 370 | 100 |
| 240 | 210 | 56.8 |
| 300 | 190 | 51.4 |
| 360 | 190 | 51.4 |

It was apparent that when starting from the polystyrene-containing blends and comparing with pure polystyrene, a much more marked reduction was possible in the amount of residual monomer in the blend, based on the amount of polystyrene.

The invention claimed is:
1. A process for removing residual styrene monomers from blends comprising polystyrene and water-insoluble, crosslinked polyvinylpyrrolidone, via treatment with water, which comprises carrying out the treatment on a particulate solid blend.
2. The process of claim 1, wherein the particulate blend is composed of polystyrene and a popcorn polymer and is mixed with water, the mixture is subjected to a steam distillation process, and then the particulate blend is isolated.

3. The process according to claim 2, wherein the mixture passed to the steam distillation process is prepared from blend and water in a ratio by weight of from 1:2 to 1:10.

4. The process according to claim 2, wherein following the steam distillation process, the particulate blend is isolated via filtration and is dried.

5. The process according to claim 2, wherein said steam distillation process is carried out at temperatures of from 100 to 120 ° C.

6. The process according to claim 2, wherein following the steam distillation process, a pulverulent blend is obtained via spray drying.

7. The process according to claim 2, wherein the particulate blend composed of polystyrene and of a popcorn polymer is mixed with water, and the water is directly drawn off from the mixture in a heatable container equipped with an apparatus for moving the composition.

8. The process according to claim 7, wherein said heatable container used, provided with an apparatus for moving the mixture, comprises a paddle dryer.

9. The process according to claim 7, wherein the mixture from which the water is directly drawn off has a ratio by weight of blend to water of from 1:1 to 3:1.

10. The process according to claim 7, wherein the mixture has a ratio by weight of blend to water of from 1:1 to 2:1.

11. The process according to claim 7, wherein the treatment in which the water is directly drawn off from the mixture takes place at temperatures of from 90 to 105° C.

12. The process according to claim 1, wherein said blend comprises from 50 to 90% by weight of a polystyrene and from 10 to 50% by weight of a water-insoluble crosslinked polyvinylpyrrolidone.

13. The process according to claim 1, wherein said polystyrene present in the blend comprises standard polystyrene, polystyrene modified with rubber so as to be highly impact resistant, or a styrene-butadiene copolymer.

14. The process according to claim 1, wherein said polystyrene present in the blend comprises standard polystyrene.

15. The process according to claim 1, wherein the content of residual styrene monomers is lowered to less than 20 mg/kg, based on the total weight of said blend.

16. The process according to claim 1, wherein the content of residual styrene monomers is lowered to less than 10 mg/kg, based on the total weight of said blend.

17. A particulate blend composed of a polystyrene and a water-insoluble crosslinked polyvinylpyrrolidone, with a residual styrene monomer content of less than 20 mg/kg, obtained by a process according to claim 1.

* * * * *